Aug. 19, 1958  F. C. BAYER  2,848,186
THROTTLE VALVE ASSEMBLY
Filed Oct. 29, 1953  2 Sheets-Sheet 1
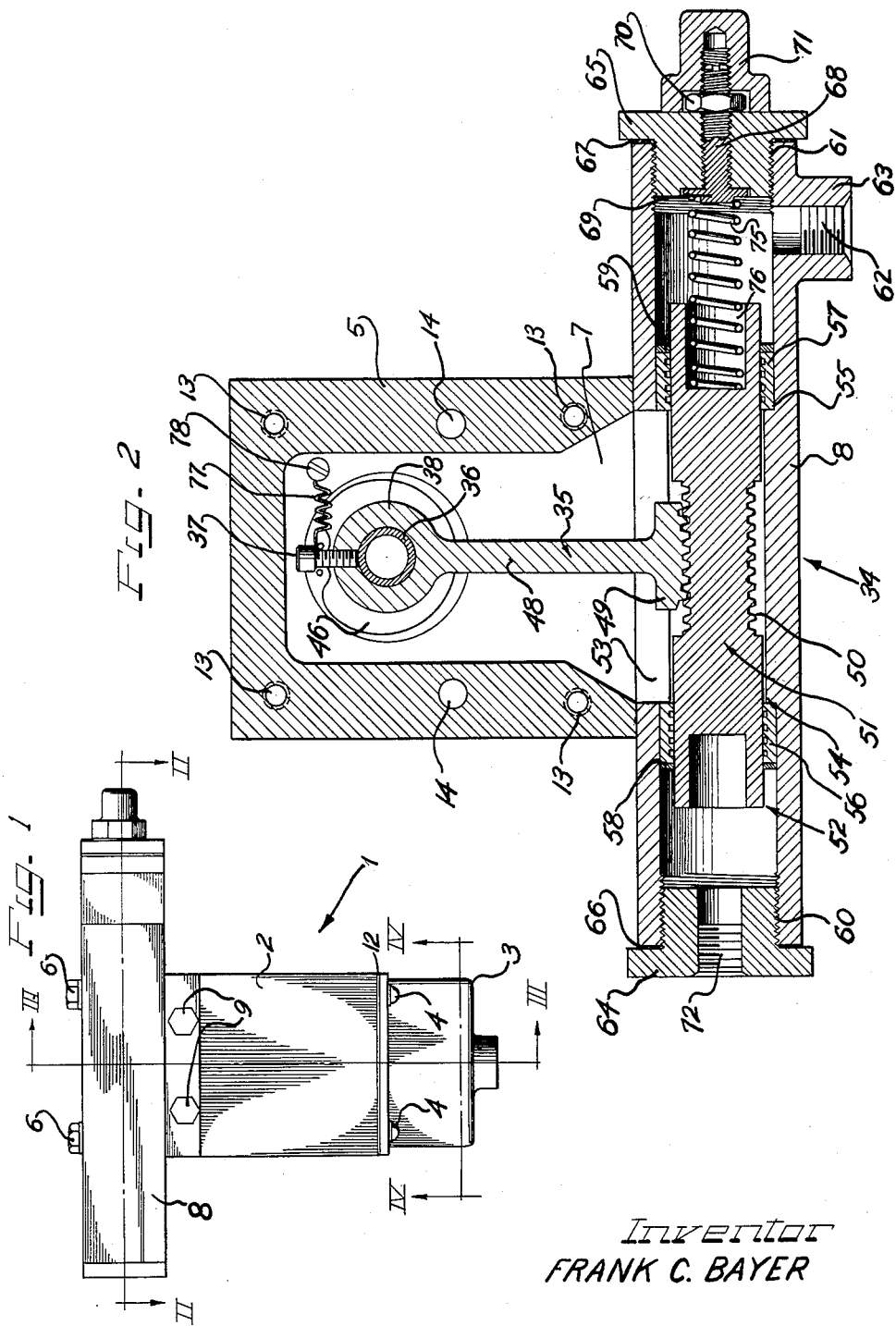
Inventor
FRANK C. BAYER Aug. 19, 1958  F. C. BAYER  2,848,186
THROTTLE VALVE ASSEMBLY
Filed Oct. 29, 1953  2 Sheets-Sheet 2
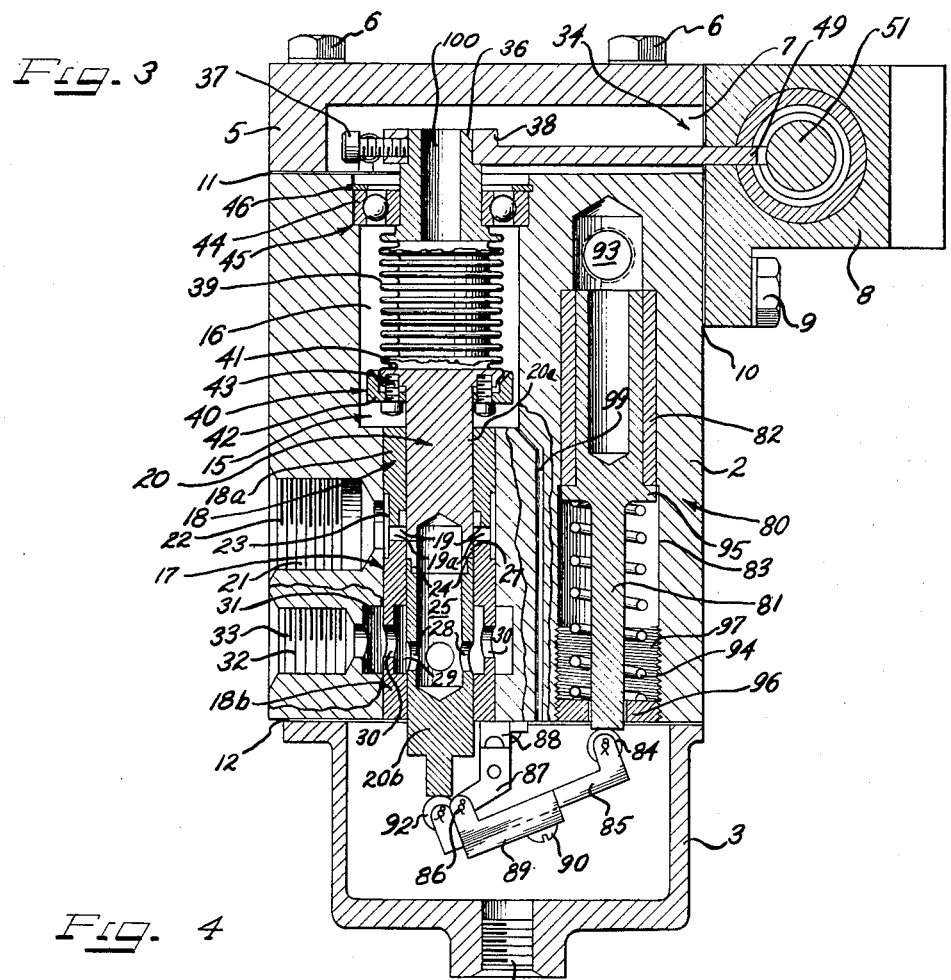
Inventor
FRANK C. BAYER

United States Patent Office 2,848,186
Patented Aug. 19, 1958

2,848,186

THROTTLE VALVE ASSEMBLY

Frank C. Bayer, Euclid, Ohio, assignor to Thompson Products, Inc., Cleveland, Ohio, a corporation of Ohio Application October 29, 1953, Serial No. 388,985

8 Claims. (Cl. 251—58)

The present invention relates to a throttle valve assembly and more particularly to a valve mechanism operable to control fluid flow therethrough linearly with respect to actuation of each of a plurality of actuator members. That is, the present invention relates to a valve assembly for controlling fluid flow linearly with respect to one flow control parameter while another flow control parameter is held constant, and linearly with respect to the other flow control parameter while the first flow control parameter is held constant.

Although valve structures and assemblies embodying the principles of the present invention are general utility assemblies and devices, they are most advantageously employable in fuel flow and control systems etc. such as that described in my copending application entitled "Fuel Flow and Control System," Serial No. 388,983, and filed on even date herewith.

In fuel flow and control systems as described in my above identified copending application it is important to control medium flow and pressures linearly with respect to each variable control oil pressure, as from a fuel regulator or the like, and speed of operation of a combustion device such as a gas turbine or the like to which the fuel is being fed. An important element in the control system is a throttle valve constructed in accordance with the principles of the instant invention to govern the control oil flow and pressure in the manner described.

Therefore, it is an important object of the present invention to provide a throttle valve structure operable to control flow therethrough linearly with respect to each of a plurality of control apertures.

Another important object of the present invention is to provide a throttle valve assembly wherein a piston having fluid flow control apertures therein is axially displaceable for linear flow control in accordance with a first actuator and angularly displaceable for linear flow control in accordance with a second actuator.

Still another object of the present invention is to provide a valve assembly with a cylinder member and a piston member each having corresponding inlets and outlets, at least one pair of which inlets or outlets, are rectilinear for linear flow control therethrough by relative axial displacement and by relative angular displacement thereof.

Yet another object of the present invention is to provide a valve assembly wherein a piston is resistably displaceable axially and resistably displaceable angularly for bi-linear control of fluid flow through a fluid passage in said piston.

Yet another object of the present invention is to provide a valve assembly wherein a flow control piston is axially displaceable and normally biased in one direction to stop fluid passage therethrough, and angularly displaceable and normally biased in one axial direction to stop fluid flow therethrough.

Yet another object of the present invention is to provide a control medium biactuatable throttle valve structure wherein a piston having a fluid passage therethrough with a rectilinear inlet and/or a rectilinear outlet is angularly displaceable by a gear and piston-rack mechanism and wherein the piston is axially displaceable by a cooperative piston and bellows assembly.

Still other objects, features and advantages of the present invention will readily present themselves from the following detailed description of the principles of the present invention and a preferred embodiment thereof, from the claims, and from the accompanying drawings, illustrating a preferred embodiment of the present invention and disclosing fully and completely each and every detail shown thereon, in which like reference numerals refer to like parts, and in which:

Figure 1 is an elevational view of a preferred form of throttle valve assembly incorporating the principles of the present invention;

Figure 2 is a plan sectional view of the throttle valve structure of Figure 1 as taken along the line II—II of Figure 1 in the direction of the arrows thereon;

Figure 3 is an elevational sectional view of the valve assembly of Figure 1 and taken along the line III—III of Figure 1 in direction of the arrows thereon; and Figure 4 is a bottom plan view of the preferred structure of Figure 1 and is taken along the line IV—IV of Figure 1 in the direction of the arrows thereon.

The preferred embodiment of the throttle valve assembly incorporating the principles of the present invention and illustrated in the drawings is externally viewed in elevation in Figure 1 and generally indicated by the numeral 1. The assembly 1 has a main cylinder block 2 below which there is secured a lower cover member 3 secured thereto by any convenient means such as round head cap screws 4 or the like and at the upper end of which there is secured a top cover 5 (Figure 3) fixed by any convenient means such as hexhead cap screws or the like 6. The top cover 5 is preferably open at one side thereof, as at 7 and the opening 7 is closed by a rack or screw piston housing and cylinder member 8 secured to the side wall of the main cylinder housing 2 by any convenient means such as hexhead cap screws or the like 9. Gaskets 10, 11 and 12 seal the junctions between the several members 8, 5, 2 and 3, respectively, as indicated, against leakage of the fluids contained by the members. Appropriate threaded dead end holes in the main cylinder block or housing 2 are provided to accept the several screws if the same are used in lieu of other convenient securing means. Such threaded dead end holes are indicated generally at 13 as examplary of the foregoing for fixing the upper cover 5 in place by the screws 6. Additional dowel holes or the like, of which the dowel holes 14 are exemplary, may be provided for initial loose positioning of the members in place, as shown in Figure 2.

The main cylinder block or housing 2 is provided with a stepped main cylinder aperture 15, the upper portion of which is of relatively larger diameter, as at 16, and the lower portion of which is of a relatively smaller diameter as at 17. A main or principal cylinder sleeve assembly 18 is preferably press fitted or the like into the relatively smaller diameter region 17 of the cylinder aperture 15 in the cylinder block 2.

This cylinder sleeve assembly 18, in the preferred embodiment, is composed of two axial sections 18a and 18b. The upper cylinder section 18a and the lower cylinder section 18b are shoulder interfitted as at 19 and are at their junction, provided with a fluid inlet 19a (described hereinbelow) to the interior of the cylinder sleeve or to a principal control piston 20. Fluid is provided to the sleeve aperture 19 from an inlet passage 21 through the cylinder block 2, and the inlet passage 21 is threaded or the like as at 22 for convenient securing of a control medium inlet tube or the like (not shown) from a source thereof such as that described in my above identified copending application.

The outer periphery of the cylinder sleeve 18 is preferably recessed, as indicated at 23, at the shoulder junction edges of the sleeve sections 18a and 18b to provide a peripheral fluid inlet flow path thereabout thereby providing for fluid flow to a plurality of inlets to the piston assembly 20. Each of the cylinder sleeve sections 18a and 18b are grooved or notched or the like as at 19a in corresponding locations thereby providing a plurality of angular, preferably square or rectangular, control orifice apertures at the junction 19 of these two sections. In the preferred construction illustrated, the lower section of 18b of the cylinder sleeve assembly 18 is radially grooved for rectilinear grooves 19a to a depth below the shoulder junction 19 so that assembly of section 18a therewith, as illustrated, leaves a relatively square or rectangular aperture.

The piston assembly 20 is similarly provided with a plurality of angular control orifice passages or apertures as at 24 leading to an interior hollow 25 in the assembly and cooperatively positioned relative to the rectilinear apertures at 19a. The orifices 24 in the piston assembly 20 are provided from constructing the piston assembly 20 from two axial sections, the upper of which is indicated at 20a and the lower of which indicated at 20b. Specifically, the two principal piston sections 20a and 20b are joined in a press fitted or otherwise secured shouldered junction similar to the junction 19 of the cylinder sleeve assembly 18 and the upper cylinder section 20a is notched or grooved as at 27 so that assembly of the piston 20 in the manner described provides square, rectangular or otherwise angular control apertures or orifices which correspond in shape and in angular position to the apertures 19a in the sleeve assembly 18. By these means fluid flow from the inlet 21 in the cylinder block 5 may proceed into the dead ended hollow interior 25 of the piston assembly 20 through the rectilinear apertures 19a and 24 in the cylinder sleeve and piston respectively. The piston assembly 20, however, has been shown in a lowered or inlet closed position whereby fluid flow through the apertures is halted.

By raising the piston, axially, in a control manner, flow through the rectilinear apertures or orifices may be linearly controlled since the opening between the corresponding apertures 19a and 24 will vary linearly with axial piston assembly reciprocation. That is, flow area at the matched rectilinear orifices 19a and 24 will vary linearly with axial movement of the piston assembly 20. In a like manner angular displacement of the piston assembly 20 when the inlet apertures are in registration will vary the flow area therethrough linearly with the angular displacement. A fluid outlet from the interior 25 of the piston assembly 20 is provided by apertures 28 through the piston wall preferably in the lower section 20b thereof, which apertures 28 may be of any convenient configuration. These apertures 28 communicate with a circumferential inner recess 29 in the inner peripheral wall of the lower section 18b of the cylinder sleeve assembly 18 in any axial or angular position of the piston assembly 20. Further apertures 30 communicate the circumferential recess 29 in the cylinder sleeve assembly 18 with a circumferential recess in the inner cylinder wall 17 of the cylinder block 2 as indicated at 31. A fluid outlet 32, threaded as at 33 for secure connection to an outlet fluid tube or the like, leads from the inner peripheral recess 31 to the exterior of the housing 2.

If it is so desired, and in accordance with the principles of the present invention, the outlet apertures in the piston assembly 20 and cylinder sleeve assembly 18 may be formed as described above for the preferred construction of the inlet aperture orifices so that fluid flow control may be accomplished at either the inlet or at the outlet or at both portions of the general fluid flow passage. The outlet ports, however, have been illustrated as having simple round drilled configuration, since proper fluid flow control may be attained with angular inlet orifices. It will be understood of course that if the outlet ports have the angular configurations above described for the inlet orifices then the inlet orifices may have the non-controlling configuration shown for the outlet ports.

Angular displacement control of the piston assembly 20 is performed by a gear and double acting piston rack or screw assembly 34. The gear 35, of the assembly 34, is fixed to a piston shaft 36 by any convenient means such as a set screw or the like 37 threaded through the hub portion 38 of the gear 35 and into locking engagement with a peripheral wall of the rotatable piston shaft 36. By securing these members together in the manner described they are co-rotatable and operate to controllably rotate the piston assembly 20 by coupling the piston shaft 36 to the upper end of the upper piston section 20a through a "Fulton Sylphon Bellows" 39 which is also fixed to the piston shaft 36. The bellows member 39, which has a very high torque resistance and very low axial displacement resistance is attached to the piston shaft 36 in any suitable manner and is attached to the upper end of the upper piston section 20a through any convenient means such as a clamp mechanism or the like 40. The clamp mechanism 40 includes a flanged end 41 on the piston section 20a and a clamp ring 42 variably spaced and secured thereto by cap screws or the like 43 to clamp the lower end of the bellows between the flange 41 and the clamp ring 42.

In this preferred throttle valve construction the piston shaft 36 is fixed against axial displacement and mounted for free rotational or angular movement by a bearing member 44 which is preferably a ball type bearing having its inner race fitted to the outer periphery of the piston shaft 36 and its outer race resting in a shouldered counterbore in the upper end of the cylinder bore 16 of the main cylinder block or housing 2, as indicated at 45. A snap ring or the like 46 fixes the ball bearing 44 against axial displacement.

The gear member 35 of the gear and double acting piston rack or screw assembly 34, as best viewed in Figure 2, is preferably only a partial or fragmental gear having a hub 38 from which there radially extends a rib or arm 48 at the outer end of which an arcuate tooth-milled gear section 49, of relatively short arc length, is secured or formed as a part thereof. The length of the rib or arm 48 is sufficient to carry the tooth gear section 49 into the angular control housing block or piston block 8 where the gear head 49 engages the tooth section or screw section 50 of a double acting piston rack or screw indicated generally at 51. The piston rack or screw 51 is mounted in the angular control cylinder block 8 transversely of the axis of the piston assembly 20 so that reciprocation of the same or rotation thereof, if it is threaded at 50, is effective to cause angular movement of the gear 35 and thereby angular displacement of the piston assembly 20.

To provide for proper mounting of the member 51, the angular control housing or cylinder block 8 is longitudinally bored, as at 52, and laterally opened, as at 53, to the opening 7 in the top cover 5. At the groove or slot 53 opening into the bore 52, the bore 52 has a reduced diameter providing shoulders 54 and 55 against which sleeve bearings 56 and 57 are substantially fixed coaxial with the bore 52. Fluid sealing rings and the like 58 and 59 are fitted against the sleeves 56 and 57, respectively, and between the piston 51 and the inner peripheral walls of the bored block 8.

The fluid sealing rings 58 and 59 are provided to prevent fluid escape into the throttle valve assembly from opposite ends of the piston 51, and are particularly important when the piston 51 is operated as a reciprocal piston that is fluid differential pressure actuated for controlled axial movement, in which event the teeth at 50 may be either rack teeth or screw teeth as desired.

The bore 52 is threaded at opposite ends 60 and 61, thereof, and a further aperture 62 is provided in a boss or the like 63 in the vicinity of the end 61 of the bore 52 and communicating with the interior of the cylinder bore 52.

Threaded aperture caps 64 and 65 are threaded into the ends 60 and 61 and sealed thereagainst to prevent fluid leakage by gaskets or the like 66 and 67 respectively. The threaded aperture in the cap 65 is sealed closed, however, by a spring seat screw member 68 threaded therethrough and provided with a spring or other biasing means seat 69 at the inner end thereof. A jam nut or lock nut 70 is threaded into the screw 68 from the outer end thereof and a cap nut 71 is threaded thereover against the outer transverse face of the apertured cap 65.

For reciprocal operation of the piston 51, as in the manner described in my above identified copending application whereby the piston is operable to be axially displaced in accordance with the differential pressure across a speed sensing valve or the like, as therein described, fluid passages such as the passage 62 in the boss 63 and the passage 72 in the apertured cap 64 are threaded or the like to provide convenient securing means for fluid tubes or the like to admit fluid, under pressure, to opposite ends of the piston 51 whereby the piston 51 will be axially displaced in accordance with the differential of the pressures at its opposite ends. To provide for normal closing of the valve when the piston 51 is an axially displaceable one, a biasing spring or the like 75 is seated against the spring seat 69 and in a dead end axial recess 76 in the adjacent end of the piston 51 to bias the piston to the left as viewed in Figure 2. In aid of the compression biassing spring member 75, a small additional spring biassing member 77 is hooked or the like onto the set screw 37 at the head end thereof, and hooked or the like onto a spring mounting screw 78 threaded into the upper end of the principle cylinder block 2. By adjustable regulation of the axial position of the spring seat screw 68, by adjustment thereof and of the jam nut 70, the biasing force on the piston 51 may be controlled.

The piston 51 is also operable as a screw member for angular displacement of the gear 35 and therefore of the control piston assembly 20 since rotation of the piston 51, when the same is threaded at 50, and fixing the piston 51 against axial displacement, will operate to angularly displace the gear 35 since the assembly 34 will then be operable as a worm gear type mechanism. Any convenient means such as a screw rod or the like extending through the end 60 of the bore 52 and engaging the adjacent end of the piston 51, may be employed to so worm gear operate the piston and gear assembly 34.

By either of these above described means the piston and gear construction 34 is operable to control angular displacement of the piston assembly 20 and thereby control fluid flow from the inlet 21 to the outlet 32 through the angular apertures or orifices 19a and 24 linearly with respect to the angular displacement as described.

Controlled axial displacement of the piston assembly 20 for variation of fluid flow therethrough linearly with respect to the axial displacement is accomplished through the mechanism of a variable control oil actuated or the like reciprocal piston-cylinder mechanism indicated generally at 80 and housed in the primary cylinder block 2 and lower cap 3. This structure may be best understood with reference to Figures 3 and 4.

A piston member 81 axially reciprocable through a cylinder sleeve 82 mounted in a control cylinder bore 83 preferably parallel to the principal cylinder bore 17 but not extending through the upper surface of the block 2, is reciprocal to control axial displacement of the primary piston assembly 20. The variable control piston 81, at its lower end bears against a roller or the like 84 journaled in one end of a lever 85 pivoted as at 86 on a fulcrum member 87 adjustably secured to a pivot bracket 88.

As shown, the lever 85 is adjustably secured to a lever adjustor member 89 by any convenient means such as a screw or the like 90 passing through an axial base slot 91 in the member 89, and the lever adjustor member 89 is journaled to the fulcrum member 87 at the pin pivot 86. At the opposite end of the lever 85 it carries another roller or the like 92, journaled thereon, which bears against the lower end of the piston assembly 20. These several members are adjustable with respect to each other and with respect to the pistons 81 and 20 and the housing block or the principal cylinder block 2 for any desired accuracy of adjustment between the piston 81 and the piston assembly 20.

Through this pivoted lever mechanism reciprocal movement of the variable control oil actuated piston 81 is conveyed to the flow control piston assembly 20 in opposite axial directions but controlled movement. That is, downward movement of the piston 81, as viewed in Figure 3, so actuates the lever 85 as to force the flow control piston assembly 20 upward axially. The variable control oil piston 81 is arranged to be forced downwardly, controllably, by oil or the like from a fuel regulator or the like, as described in my above identified copending application, supplied to the piston 81 at its upper end, through a variable control oil inlet aperture or the like 93 extending through the side of the cylinder block 2 and admitting variable control oil under controlled pressure to the upper end of the variable control oil piston 81. The piston 81 is movable downwardly, as illustrated in Fig. 3, by variable control oil pressure, referenced to its upper end through port 93, against two biasing mechanisms. The first of these is a biasing spring or the like 94 which is confined between a shoulder or flange area 95, which is arranged to stop upon engagement with the cylinder sleeve 82, and which biasing spring member 94, at its other end, bears against an adjustable biasing nut 96 threaded into a threaded lower end portion 97 of the cylinder bore 83. Adjustment of the nut 96, axially with the piston 81 passing therethrough, adjusts the biasing force of the spring 94 against the pressure of the variable control oil admitted through the inlet 93.

The second biasing force is provided by the spring action of the "Fulton Sylphon Bellows" which is preferably naturally resiliently expansible. Of course, a spring member or the like may be included within the bellows member 39 if so desired to assist in this biasing action. The force from either the biasing spring or the natural biasing force of the bellows 39 urges the flow control piston assembly 20 downwardly against the roller 92 of the lever 85 thereby pivoting the roller end 84 of the lever 85 upwardly to aid in biasing the piston 81 upwardly and further importantly operative to bias the piston assembly 20 downwardly upon release of variable control oil pressure admitted to the inlet 93 to the piston 81.

The threaded aperture 98 in the cap 3 is a drain line connection. Leakage from the high pressure ends of piston 51 flows into the space in which the gear arm is located and passes through the ball bearing into chamber 16, through passage 99 to the space within the lower cover 3. Leakage upwardly between piston 20 and sleeve 18 also enters space 16 and flows through passage 99 into the lower cover 3. Leakage downwardly between piston 20 and sleeve 18 from annulus 29 flows directly into the lower cover 3. Leakage past piston 81 and sleeve 82 also reaches the space in the lower cover after passing through the clearance between the piston 81 and the adjusting nut 96. To prevent pressurization of the case the leakage from these several sources is drained from the cover 3 through opening 98 and returned through a suitable drain line to the supply tank.

The lubricating and leakage fluid also aids in lubricating the several moving parts of this throttle valve mechanism for free movement and to reduce wear thereof.

The several biasing mechanisms and systems are so operative as to maintain the angular orifices in a non-flow or closed valve relation in the absence of variable control oil pressure actuating the piston 81. Pressure on the piston 81 from variable control oil admitted through the inlet 93 is operative to control fluid flow through the angular orifices linearly with respect to variable control oil pressure by controlled axial movement of the piston assembly 20 since control linear movement of the piston assembly 20 linearly controls the area for fluid flow through the angular apertures at the fluid inlet.

Thus, by the valve structure of the present invention linear control of a fluid medium may be accomplished with respect to each of a plurality of apertures as described.

It will be understood, from the foregoing, that numerous variations and modifications may be made without departing from the true spirit and scope and principles of the present invention. I, therefore, intend to cover all such modifications and variations as fall within the spirit and scope and principles of my invention.

I claim as my invention:

1. A biactual throttle valve assembly for controlling fluid flow comprising a housing having a valve cylinder and a rotatable and linearly movable valve therein, a first piston and cylinder assembly in said housing to control linear movement of said valve in said housing, a rack and gear assembly in said housing, a second piston and cylinder assembly in said housing cooperating with said rack and gear assembly to control rotary movement of said valve in said housing, a bellows type motion transmitting mechanism in said housing assembled intermediate the gear of said rack and gear assembly and said valve, inlet and outlet flow apertures in the housing, said valve having inlet and outlet flow apertures and a connecting passage therebetween, said inlet and outlet flow apertures of the housing respectively registering with the inlet and outlet apertures of the valve, and at least one of said registering sets of housing and valve apertures being angular, whereby variations in the relative position of said valve varies the fluid flow through the angular apertures linearly with respect to variations in the relative positions thereof as controlled by the first and second pistons and cylinder assemblies.

2. A biactual throttle valve assembly for controlling fluid flow comprising a housing having a valve cylinder and a rotatable and linearly movable valve therein, a first piston and cylinder assembly in said housing to control linear movement of said valve in said housing, a rack and gear assembly in said housing, a second piston and cylinder assembly in said housing cooperating with said rack and gear assembly to control rotary movement of said valve in said housing, a bellows type motion transmitting mechanism in said housing assembled intermediate the gear of said rack and gear assembly and said valve, an angular inlet flow aperture in the housing, an outlet flow aperture in said housing, said valve having an angular inlet flow aperture, an outlet flow aperture and a fluid flow passage therebetween, said valve having its angular inlet flow aperture positioned to controllably register with the angular inlet flow aperture in the housing, an adjustable rocking lever means pivotally mounted upon said housing between said valve and said first piston, said pivotally mounted rocking lever means being adjustable in length and for coupling said valve to the first piston, whereby variations in the relative position of said valve varies the fluid flow through the angular inlet apertures linearly with respect to variations in the relative positions thereof as controlled by the first and second pistons and cylinder assemblies.

3. A biactual throttle valve assembly for controlling fluid flow comprising a housing having a valve cylinder and a rotatable and linearly movable valve therein, a first piston and cylinder assembly in said housing to control linear movement of said valve in said housing, a rack and gear assembly in said housing, a rotary shaft assembled with the gear of said rack and gear assembly, said shaft held against axial shifting by said housing, a second piston and cylinder assembly in said housing cooperating with said rack and gear assembly to control rotary movement of said shaft in said housing, a bellows type motion transmitting mechanism in said housing interconnecting said shaft and said valve, an angular inlet fluid flow aperture and an outlet fluid flow aperture in said valve interconnected by a fluid flow passageway, said angular fluid flow inlet aperture in said valve registerable with an angular fluid flow inlet aperture in the housing and said fluid flow outlet in said piston valve registerable with a fluid flow outlet aperture in the housing to control fluid flow linearly with respect to relative axial displacement of the valve and linearly with respect to relative rotational displacement of the valve, said second piston and cylinder assembly in said housing arranged with its axis transversely to the axis of said valve, said rack cooperating with said second piston, said gear associated with said rack and secured to said rotary shaft to thereby rotatably displace said bellows mechanism and said valve and control fluid flow in the cylinder embodying said second piston, whereby the fluid will displace said second piston and the rack cooperating therewith to thereby actuate the gear which rotatably displaces the valve by rotating said shaft and bellows mechanism to control flow of fluid through said angular inlet flow apertures.

4. A biactual throttle valve assembly for controlling fluid flow comprising a housing having a valve cylinder and a rotatable and linearly movable valve therein, a first piston, a biasing spring, and cylinder assembly in said housing to control linear movement of said valve in said housing, a rack and gear assembly in said housing, a second piston, a biasing spring, and cylinder assembly in said housing cooperating with said rack and gear assembly to control rotary movement of said valve in said housing, a bellows type motion transmitting mechanism in said housing assembled intermediate the gear of said rack and gear assembly and said valve, an angular inlet flow aperture in the housing, an outlet flow aperture in said housing, said valve having an angular inlet flow aperture, an outlet flow aperture and a fluid flow passage therebetween, said valve having its angular inlet flow aperture positioned to controllably register with the angular inlet flow aperture in the housing, a lever means pivotally mounted upon said housing between said valve and said first piston, said pivotally mounted lever means coupling said valve to the first piston, whereby variations in the relative position of said valve varies the fluid flow through the angular inlet apertures linearly with respect to variations in the relative positions thereof as controlled by the first and second pistons and cylinder assemblies.

5. A biactual throttle valve assembly for controlling fluid flow comprising a housing having a valve cylinder and a rotatable and linearly movable valve therein, a first piston and cylinder assembly in said housing to control linear movement of said valve in said housing, a rack and gear assembly in said housing, a second piston and cylinder assembly in said housing cooperating with said rack and gear assembly to control rotary movement of said valve in said housing, a bellows type motion transmitting mechanism in said housing assembled intermediate the gear of said rack and gear assembly and said valve, a fluid passage in the valve, an angular inlet flow aperture to said passage and a fluid outlet aperture from the passage, a fluid inlet aperture in the housing and an angular inlet flow aperture in the valve cylinder arranged to communicate with the angular inlet flow passage in the valve and a fluid outlet aperture in the housing and in the valve cylinder arranged to communicate with a fluid outlet from the passage in the valve whereby the fluid flow through the angular inlet apertures is variable with respect to actuating movement of the valve controlled by the first and second pistons and cylinder assemblies.

6. A biactual throttle valve assembly for controlling fluid flow comprising a housing having a valve cylinder and a rotatable and linearly movable valve therein, a first piston and cylinder assembly in said housing to control linear movement of said valve in said housing, a rack and gear assembly in said housing, a second piston and cylinder assembly in said housing cooperating with said rack and gear assembly to control rotary movement of said valve in said housing, a bellows type motion transmitting mechanism in said housing assembled intermediate the gear of said rack and gear assembly and said valve, said first piston and cylinder assembly arranged in a plane in said housing extending parallel with the axis of said valve, said second piston and cylinder assembly arranged in a plane extending transversely of the axis of said valve, an inlet flow aperture in the wall of said housing, an outlet flow aperture in the wall of said housing, an angular inlet flow aperture in the wall of said valve cylinder in register with said inlet in said housing, an outlet flow aperture in the wall of said valve cylinder in register with said outlet in said housing, an angular inlet flow aperture in said valve positioned to controllably register with said angular inlet flow aperture in the valve cylinder, an outlet flow aperture in said valve in register with said outlet in said valve cylinder, a fluid flow passage between said inlet and said outlet apertures in said valve, whereby variations in the relative position of said valve member varies fluid flow through the angular inlet flow apertures linearly with respect to the variations in the relative positions thereof as controlled by said first and second piston and cylinder assemblies.

7. A biactual throttle valve assembly for controlling fluid flow comprising a housing having a valve cylinder and a rotatable and linearly movable valve therein, a first piston, a biasing spring and cylinder assembly in said housing to control linear movement of said valve in said housing, a rack and gear assembly in said housing, a second piston, a biasing spring, and cylinder assembly in said housing cooperating with said rack and gear assembly to control rotary movement of said valve in said housing, a bellows type motion transmitting mechanism in said housing assembled intermediate the gear of said rack and gear assembly and said valve, said first piston and cylinder assembly arranged in said housing parallel with the axis of said valve, said second piston and cylinder assembly arranged in said housing transversely of the axis of said valve, an angular inlet flow aperture in the housing, an outlet flow aperture in said housing; said valve having an angular inlet flow aperture, an outlet flow aperture and a fluid flow passage therebetween; said valve, having its angular inlet flow aperture positioned to controllably register with the angular inlet flow aperture in the housing, whereby variations in the relative position of said valve varies the fluid flow through the angular inlet apertures linearly with respect to variations in the relative positions thereof as controlled by the first and second pistons and cylinder assemblies.

8. A biactual throttle valve assembly for controlling fluid flow comprising a housing having a valve cylinder and a rotatable and linearly movable valve therein, a first piston and cylinder assembly in said housing to control linear movement of said valve in said housing, a rack and gear assembly in said housing, a second piston and cylinder assembly in said housing cooperating with said rack and gear assembly to control rotary movement of said valve in said housing, a bellows type motion transmitting mechanism in said housing assembled intermediate the gear of said rack and gear assembly and said valve, the valve cylinder in the housing having a plurality of apertures therethrough, the inlet flow aperture in the valve cylinder having an angular configuration, an inlet flow aperture in said housing in communication with said inlet flow aperture in said valve cylinder and an outlet flow aperture in said housing in communication with the other of said flow apertures in said valve cylinder, a plurality of apertures in the valve positioned to register with said plurality of apertures in the valve cylinder, the inlet flow aperture in the valve having an angular configuration and being controllably registerable with the angularly configurated inlet flow aperture in the valve cylinder, said piston member being relatively axially movable and relatively rotatably movable by action of the first and second pistons and cylinder assemblies, to control fluid flow through the angular inlet apertures.

References Cited in the file of this patent
UNITED STATES PATENTS

| Number | Name | Date |
| --- | --- | --- |
| 654,009 | Kittinger | July 17, 1900 |
| 1,272,384 | Conrader | July 16, 1918 |
| 2,023,627 | Underwood | Dec. 10, 1935 |
| 2,042,391 | Crist | May 26, 1936 |
| 2,193,701 | Tabb | Mar. 17, 1940 |
| 2,520,430 | Pearson | Aug. 29, 1950 |